(12) United States Patent
Jannink et al.

(10) Patent No.: US 8,756,333 B2
(45) Date of Patent: Jun. 17, 2014

(54) INTERACTIVE MULTICAST MEDIA SERVICE

(75) Inventors: Jan F. Jannink, Menlo Park, CA (US); Timothy E. DeGraw, San Francisco, CA (US); Jasson A. Schrock, Mountain View, CA (US)

(73) Assignee: Myspace Music LLC, Beverly Hills, CA (US)

( * ) Notice: Subject to any disclaimer, the term of this patent is extended or adjusted under 35 U.S.C. 154(b) by 1811 days.

(21) Appl. No.: 11/603,539

(22) Filed: Nov. 22, 2006

(65) Prior Publication Data

US 2008/0120501 A1 May 22, 2008

(51) Int. Cl.
*G06F 15/16* (2006.01)

(52) U.S. Cl.
USPC ............................ 709/231; 709/203; 709/230

(58) Field of Classification Search
None
See application file for complete search history.

(56) References Cited

U.S. PATENT DOCUMENTS

| | | | |
|---|---|---|---|
| 5,616,876 A | 4/1997 | Cluts | |
| 6,839,059 B1 | 1/2005 | Anderson et al. | |
| 6,956,593 B1 | 10/2005 | Gupta et al. | |
| 6,965,770 B2 | 11/2005 | Walsh et al. | |
| 7,111,009 B1 | 9/2006 | Gupta et al. | |
| 7,120,871 B1 | 10/2006 | Harrington | |
| 7,162,696 B2* | 1/2007 | Wakefield | 715/716 |
| 2005/0160270 A1* | 7/2005 | Goldberg et al. | 713/176 |
| 2006/0143236 A1 | 6/2006 | Wu | |
| 2006/0161621 A1 | 7/2006 | Rosenberg | |
| 2006/0184977 A1 | 8/2006 | Mueller et al. | |
| 2006/0253781 A1* | 11/2006 | Pea et al. | 715/723 |
| 2006/0282864 A1* | 12/2006 | Gupte | 725/89 |
| 2007/0282675 A1* | 12/2007 | Varghese | 705/14 |
| 2008/0059536 A1* | 3/2008 | Brock et al. | 707/200 |
| 2008/0091509 A1* | 4/2008 | Campbell et al. | 705/10 |

OTHER PUBLICATIONS

"MySpace" [online]. MySpace.com 2003-2006 [retrieved on Oct. 4, 2006]: <URL: www.myspace.com/falloutboy>.
Carlin, D., "Last.FM: Mashing to the Music," BusinessWeek.com, [online] [retrieved on Nov. 22, 2006] <URL: www.businessweek.com/print/technology/content/nov2006/tc20061113_604776.htm>.

* cited by examiner

*Primary Examiner* — Minh-Chau Nguyen
(74) *Attorney, Agent, or Firm* — Gates & Cooper LLP

(57) ABSTRACT

A multicast media service is provided. The multicast media service may be implemented using a media server that multicasts media files to users at user computing equipment. The multicast media service maintains playlists of media files. Users that receive the same multicasted media files at the same time form a viewer group. The multicast media service displays media player screens for each user in the viewer group. The media player screens include a media player region in which a media file that is currently being multicasted is played. Each media player screen also includes a current playlist of media files. The users in the viewer group can communicate about a currently playing media file using real time chat. Users can also upload associated content such as tags, persistent comments, and ratings. The multicast media management service may automatically suggest playlist modifications and can support navigation options.

20 Claims, 3 Drawing Sheets

INTERACTIVE MULTICAST MEDIA SERVICE

BACKGROUND

The present invention relates to media multicasting, and more particularly, to multicast services in which user interactions influence the way in which media is presented to users.

Online communities exist in which users can interact and share media. For example, services are available that allow people to share songs and videos by uploading them to a web page associated with an internet site. A user of the service can navigate to the web page using navigation buttons and keyword searches. Upon reaching the web page, the uploaded songs and videos can be played for the user using a media player. The user can provide feedback on the songs and videos in the form of comments and ratings and can view the comments and ratings of other users.

Although the online communities that are associated with services such as these provide an opportunity for users to interact with each other, users do not generally share media playback experiences at the same time. This can limit the opportunities that users have to interact with each other.

It would therefore be desirable to be able to provide a multicast media service that multicasts media files to multiple users while allowing the users that are viewing the multicast media to interact with each other in real time.

SUMMARY

A multicast media management service is provided. The multicast media management service may be implemented using a media server that multicasts media files to users at user computing equipment. Users of the service can upload media files to the media server. The media files may be, for example, video files, audio files, blog posts, images, or any other suitable media files.

The multicast media management service maintains playlists of media files. During each multicast, the multicast media management service transmits the media files on a playlist to users at user computing equipment over a network. The media files may be played in order, starting from the top of the playlist.

Users can interact with the playlists and each other as the media files on the playlist are played back. For example, users can exchange messages with other members in the viewer group. The messages that are exchanged are sometimes referred to as chat messages and the message exchange process is sometimes referred to as a chat session or group chat. New viewers can join an existing group chat. If many viewers leave a group chat, the chat session can remain pending with only one active participant to allow for the possibility of additional viewers joining the chat. If desired, messages can be exchanged privately between a pair of viewers. In this type of scenario, which is sometimes referred to as instant messaging (IM) mode, the message exchange session expires if either participant leaves the chat. Users can also add tags, comments, and ratings for the media files that are being played. User-uploaded content that is associated with a media file that is being played can be stored in one or more databases on the media server.

The playlist and the media file may be displayed for the users on a common media file playback screen. A list of users who are receiving the same multicasted media file can also be displayed. Users can exchange real-time chat messages with other listed users.

The multicast media management service may automatically suggest playlist modifications such as suggested media file additions and deletions. Proposed playlist modifications may be identified by the service by analyzing user-supplied associated content such as tags, comments, ratings, and chat messages. Users can provide feedback on proposed playlist modifications using voting buttons or other on-screen options. The multicast media management service may use a related content server to display targeted advertisements or other related content to the users.

Further features of the invention, its nature and various advantages will be more apparent from the accompanying drawings and the following detailed description.

DETAILED DESCRIPTION

The present invention relates to a service that allows users to share media files. The media files may be multicast to users of the service over the internet, so the service may sometimes be referred to as a multicast media service. During a multicast, a group of multiple users is simultaneously presented with the same media. The multicast media service allows the users in the group to communicate with each other through real-time interactions such as real-time chat and through more long-term interactions such as by providing persistent comments and ratings on the media.

Services that allow users to develop online relationships and to participate in online communications are sometimes referred to as social networking services. Because the multicast media service may be used to support communications between a group of users, the multicast media service may be considered to be a type of social networking service. Users of the multicast media service often view media files such as videos, so the users of the multicast media service are sometimes referred to as viewers, regardless of whether the media that is being played back is text, audio, or video. Users who log into the multicast media service are sometimes referred to as being members of the service.

Figure 1:
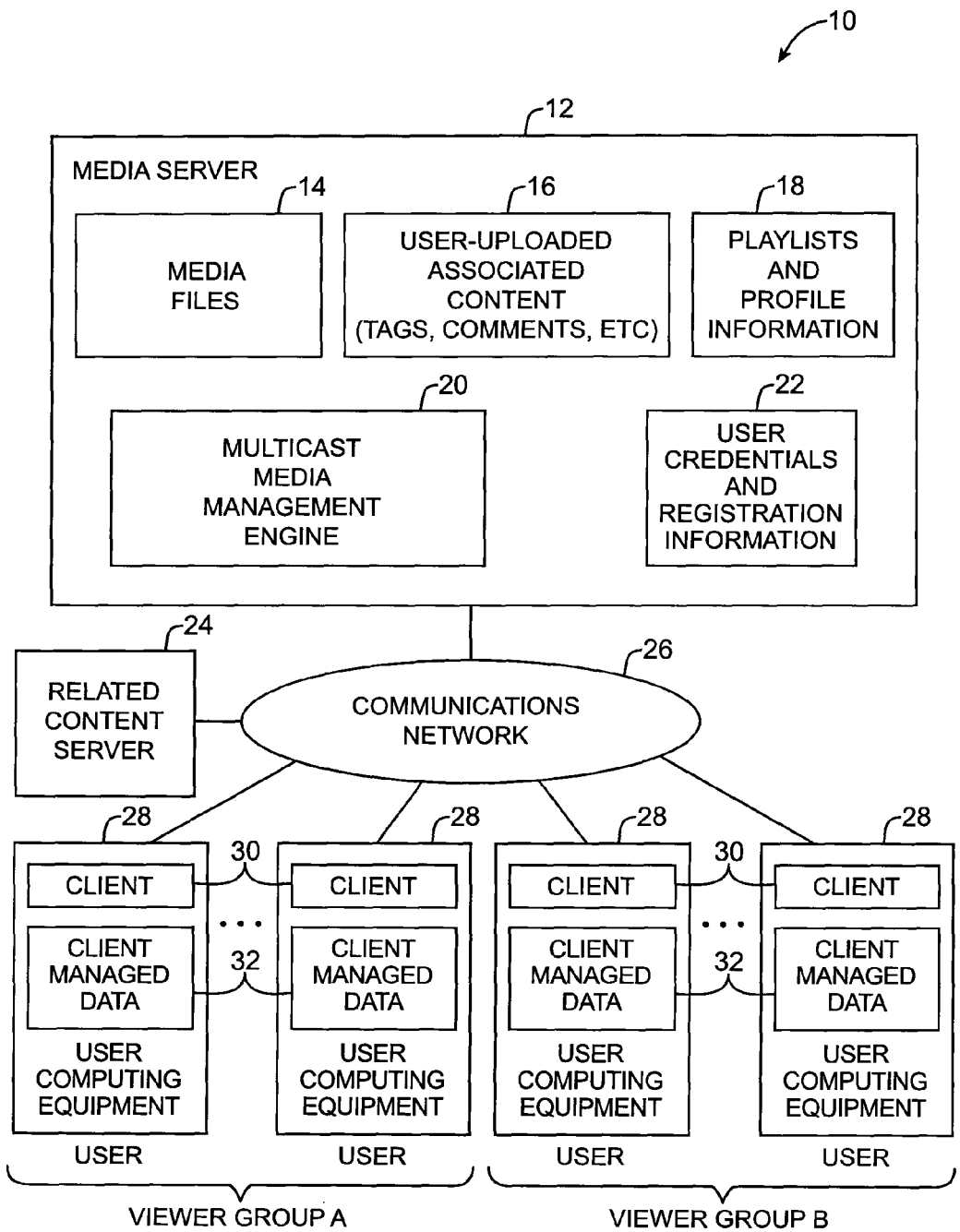
FIG. 1 is a diagram of an illustrative system that may be used to support an online service that multicasts media to groups of users in accordance with the present invention.

An illustrative system 10 that may be used to support a multicast media service in accordance with the present invention is shown in FIG. 1. Users at computing equipment 28 receive multicast media from a database of media files 14 stored on media server 12 over communications network 26. Users at computing equipment 28 can also receive targeted advertisements and other related content using one or more servers such as related content server 24.

Related content server 24 and media server 12 may be implemented using one or more computers at one or more different locations. For example, servers such as servers 24 and 12 can be implemented on the same hardware platform. Servers can also be configured to operate in a distributed fashion using computing equipment that is located at geographically separate locations.

User computing equipment 28 may be personal computers, handheld computers, cellular telephones with handheld computing equipment functions, workstations, mainframe computers, or any other suitable computing equipment.

Communications network 26 may include any suitable communications networks such as the internet and/or other wide area networks, local area networks, etc.

The operations of the multicast media service can be managed using a multicast media management engine 20. Multicast media management engine 20 performs functions such as managing data uploads to server 12, maintaining databases on server 12, and streaming media to users over communications network 26. Multicast media management engine 20 can also be used to identify content that is related to the media that is being presented to the users. For example, multicast media management engine 20 can identify which advertisements are related to a currently playing video clip. Multicast media engine 20 can then coordinate the presentation of the targeted advertisements or other content to the user using related content server 24. Users may be required to log into the service. Multicast media management engine 20 may store user credentials and other registration information 22 in a database on media server 12.

Each user typically has a client 30. Clients 30 run on user computing equipment 28. Clients 30 may be based on web browsers with plug-ins or may be dedicated media player clients. Clients 30 allow users to view multicast media files. Clients 30 also allow users to upload content that is associated with media files that are being multicasted. Examples of user-uploaded associated content include keywords (tags), comments, and ratings and chat messages (e.g., group chat messages or IM messages). User-uploaded associated content 16 may be maintained in a database on server 12 by multicast media management engine 20. During operation, clients 30 may store local data 32 on user computing equipment 28. For example, a user's client 30 may store information that is specific to the user's session with the multicast media service.

The multicast media service allows users at user computing equipment 28 to communicate with each other about images, text, songs, videos, and other media files of mutual interest. Users can upload media files to media server 12 over communications network 26 from user computing equipment 28. The media files 14 may be maintained in a database on media server 12.

Media files may be made available to users of the multicast media service through screens that are displayed for the users by the users' media players (clients 30). In a typical scenario, a user creates a personal profile in the online service. The personal profile may contain personal profile information such as media file descriptions, blog entries, cover art, links to favorite web sites, etc. The personal profile may also contain subprofiles for various topics (e.g., a particular recording artist). Subprofiles, which are also sometimes referred to as topic profiles, can contain streamable media files, media file descriptions, blog entries, cover art, links to favorite web sites, etc. Media server 12 maintains one or more databases in which media server 12 stores data 18 such as personal profile and topic profile data.

Data 18 may include playlist data. A typical playlist includes a list of media files that are to be multicasted to a group of users. A group of users receiving the same multicasted media file is sometimes referred to as a viewer group. The users in each viewer group are presented with the same media at the same time. Consider, as an example, a playlist that contains five audio files. The service plays the first of the five audio files to all of the users in a given viewer group in synchronization over communications network 26. Once the first audio file has finished, the multicast media service can stream the second audio file to the viewer group. The third, fourth, and fifth audio files are played back in a similar fashion. Each user in the viewer group uses a respective client 30 to play the audio files. The files are multicasted, so each user in the viewer group is presented with the audio files in the same sequence and at the same time. For example, all of the users in the viewer group are presented with the first audio file at the same time and, following completion of the first audio file, all of the users in the viewer group are presented with the second audio file at the same time, etc.

Because the users in each viewer group view the same media files in synchronization, the users in each viewer group are sharing a common media viewing experience. The multicast media service therefore provides an environment in which viewers who are viewing the same content can communicate about that content in real time. Real-time communications may take place, for example, using real-time chat sessions. During a chat session, users can exchange chat messages with other users in a viewer group that relate to a media file that is currently being multicast to all of the users in the group.

The multicast media management service may use any suitable arrangement for supporting chat messages. With one suitable arrangement, the service supports group chat and instant messaging functionality.

In group chat mode, viewers can navigate to a screen of interest that contains a playlist, media file player, and a group chat window. The viewers can then join the group chat and can exchange shared group chat messages regarding the playlist and currently playing media file. There may be any suitable number of group chat participants (e.g., one, two, three, more than three, etc.).

In instant messaging mode, only two viewers are typically involved in a chat. These viewers can exchange instant messages related to the playlist and currently playing media file. Chat messages of the instant messaging type are private, so other viewers cannot view the messages that are exchanged in instant messaging mode. To avoid the possibility of other viewers being able to view the instant messages that are being exchanged between two viewers, these other viewers may be prevented from navigating to a screen that contains the playlist and media file being viewed and discussed by the instant message session participants. Alternatively, other viewers may be allowed to navigate to this screen, but are not presented with any of the instant messaging content by the service. Instant messaging messages and group chat messages may be displayed using any suitable user interface (e.g., a pop-up window, a window or region that is embedded on a screen containing a playlist and/or media player, etc.)

In addition to providing chat messages that relate to the playlist and currently playing media file, users can contribute ratings (e.g., star ratings, thumbs up/down ratings) for the media file, users can contribute tags (also sometimes referred to as keywords) that relate to the media file, and users can add persistent comments on the media files (i.e., comments that are stored on media server 12 for days, months, or years, unlike non-persistent user-uploaded associated content such as chat messages).

Clients 30 may present media files to users and may gather user input using any suitable arrangement. In a typical scenario, clients 30 present a series of interactive screens for users on displays in user computing equipment 28. Users can interact with interactive on-screen options that are contained within the interactive screens. The interactive on-screen options may include clickable buttons and links, drop down menus, scrollable and draggable items, etc. The interactive screens may be provided in the form of web pages (e.g., when client 30 is implemented using a web browser) or may be provided in the form of web-like interactive pages (e.g., when client 30 is implemented as a stand-alone application). At least some of the screens that are presented to users of the multicast media service contain a media player. The media player may be used to present media file content to users.

The type of playback operations that are performed by the media player are dependent on the type of media file that is being played to the user. For example, during video file playback operations, the media player presents a moving video image to the user that is accompanied by an optional audio track. During audio file playback operations, the media player plays audio to the user through the user's computing equipment speakers. The media player may also be used to provide users with other types of content (e.g., images, text, etc.)

Figure 2:
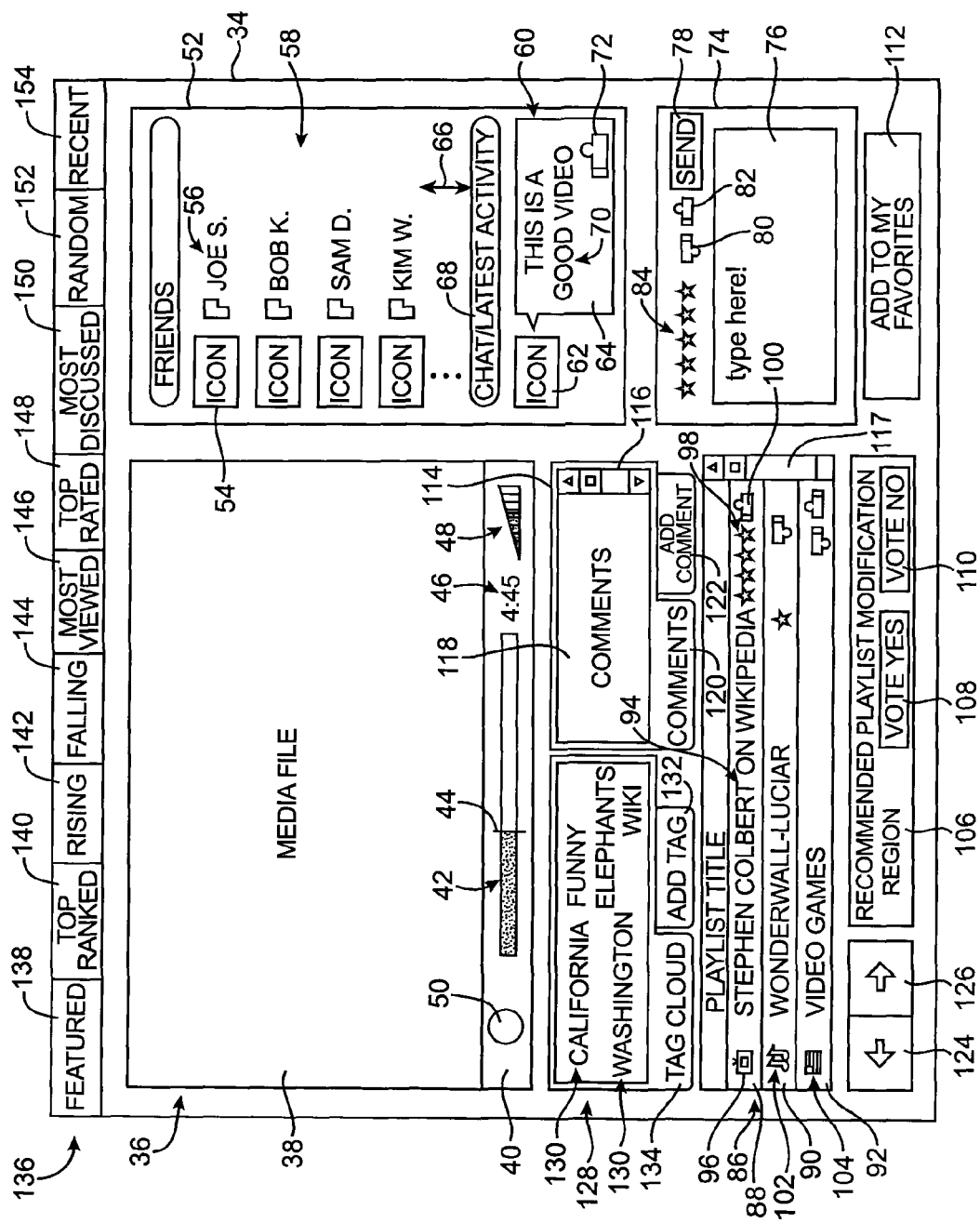
FIG. 2 shows an illustrative screen that the multicast media service may display for users in accordance with the present invention.

An illustrative screen containing a media player of the type that clients 30 can display for users on user computing equipment 28 of FIG. 1 is shown in FIG. 2. As shown in FIG. 2, screen 34 may include a media player 36. Because screen 34 contains a media player 36, screen 34 may sometimes be referred to as a media player screen or a media player.

Media player 36 may display visual content in a display region such as media file display region 38. In a typical scenario, the media file is played automatically when the user navigates to screen 34. When a media file contains only audio, region 38 may be reduced in size to save screen area. Visual content that may be displayed by the media file includes, video, graphics, text, images, etc. Audio content that may be played by player 36 includes audio files such as songs and audio tracks that accompany videos, graphics, text, images, etc.

Media player 36 may have a media player control region such as control region 40. Control region 40 may contain status indicators such as progress bar 42. An indicator such as progress indicator 44 may be used to visually indicate how much of the currently playing media file has been played and how much remains. Time indicators such as time indicator 46 may be used to provide a viewer with information on the total length associated with a media, the length of time remaining in a media file, the elapsed playback time, etc.

Media player controls 40 may include a volume control 48. A user may click on a particular volume bar in the volume control 48 to set a desired playback volume for the media player. In the example of FIG. 2, the volume control 48 also serves as a type of status indicator, because the currently selected volume level is indicated by darkening appropriate bars. Additional media player control functions can be included in media player controls 40 if desired. For example, media player 36 may have one or more additional interactive options such as button 50. Buttons such as button 50 may be used to control the operation of media player 36 (e.g., to mute currently playing audio).

Media player screen 34 contains a friends and chat region 52. The media file that is currently being played back in media file region 38 is part of a multicast in which multiple users (i.e., the users in a particular viewer group) are all simultaneously viewing the same media file. The users in that particular viewer group are listed in portion 58 of region 52. In a typical scenario, only the users that are currently viewing the media file that is being played back by media player 36 are listed in region 58 (i.e., the users listed in region 58 are all members of the same viewer group).

Each user listed in region 58 may have an associated icon 54 and username 56. The icons 54 may be default graphic images, user-selected images, user-uploaded personal images, animated icons, etc. The usernames 56 may be actual user names or may be screen names that users are assigned or select upon registering with the multicast media management engine.

Region 52 preferably includes a chat region 60. As indicated by arrow 66, a user may, if desired, expand the size of the chat region 60 by dragging title bar 68 up or down on screen 34.

Chat region 60 includes a chat message region 64 in which chat message text 70 is displayed. If desired, additional user-uploaded content may be displayed in regions such as region 64. In the example of FIG. 2, a user has rated the currently playing media file by giving it a thumbs up rating. The thumbs up rating is indicated by the thumbs up rating icon 72. Ratings information such as a thumbs up or down rating or a star rating, serves as a form of persistent user-uploaded content that is associated with the currently playing media file. Media server 12 can retain ratings information and other persistent user-uploaded associated content for a relatively long time (e.g., days, months, years, etc.). Chat message text such as text 70 is typically not retained for a long period of time by media server 12 and therefore generally serves as a type of non-persistent content. Once a chat or a portion of a chat is over, chat text may be deleted from media server 12.

Chat region 60 may include an icon 62 corresponding to the user that contributes each listed chat message and each other item of uploaded associated content. In the example of FIG. 2, only a single chat message 70 is shown in chat region 60, so only a single icon 62 is shown in region 60.

Each user can supply chat messages using a chat region such as chat region 74. Text for a chat message can be typed into region 76. Because a media file is being played by media player 36, the chat comments that the viewer group users of region 58 contribute are typically associated with the media file. A user can rate the currently playing media file using star ratings option 84 and thumbs up and down ratings buttons 80 and 82. In a typical scenario, a user clicks on a desired star in star ratings option 84, which causes a selected number of stars to be highlighted (e.g., four out of five stars). Alternatively, or in addition to supplying a star rating, the user can use the thumbs-up/thumbs-down rating option to provide a thumbs up rating or a thumbs down rating by clicking on button 80 or 82. When the user is ready to upload the chat message and ratings information, the user can click the send button 78.

Media player screen 34 preferably contains a media file playlist 86. Playlist 86 contains the media file that is presently being played by media player 36 and contains upcoming media files that are to be played in sequence after the currently playing media file has been played. In the example of FIG. 2, playlist 86 contains entries for three media files. Playlist entry 88 corresponds to a video file that is currently being played. Playlist entry 90 corresponds to an audio file, and playlist entry 92 corresponds to a blog post. Playlist entries may include media file title information and associated information. In the example of FIG. 2, playlist entry 88 contains a media file title 94, rating 98, and rating 100. Ratings information such as rating 98 and rating 100 may be gathered by media server 12 based on user-uploaded ratings. As an example, the ratings information that is displayed in playlist 86 may represent average ratings. Multicast media management engine 20 may compute average ratings based on the ratings that have been uploaded by viewers. It is not necessary for all playlist entries to include ratings information. As shown in FIG. 2, for example, playlist entry 92 does not include any ratings information.

Playlist entries in playlist 86 may contain media type icons. In the example of FIG. 2, media file entry 88 corresponds to a video clip, so media file entry 88 contains a video icon 96.

Media file entry 90 corresponds to a song, so media file entry 90 contains a song icon 102. Blog post icon 104 is used to label media file entry 92. A user can click on a desired icon to restrict the playlist entries in playlist 86 to a particular type. For example, a user that is interested in video content can click on video icon 96. When the user clicks on video icon 96, the playlist 86 is filtered so that only video playlist entries are displayed.

Media files are generally played by player 36 in the order in which they are listed in playlist 86. The topmost media file entry in playlist 86 may be played first. When this file has been played in its entirety, the topmost entry in playlist 86 can be removed from the playlist and the next entry in the playlist may be played. Users can use playlist history navigation options such as forward and back buttons 124 and 126 to browse through a playlist history. The playlist history may contain a list of media files that have already been played and removed from the version of the playlist that is displayed on screen 34. When navigating through the playlist history, a user will join various new viewer groups.

If desired, a user may navigate to previously played or skipped media files using an option such as scroll navigation option 117. By clicking on a displayed media file, the user can direct the multicast media service to play back the media file. The user then becomes part of a new viewer group.

A user can add a playlist to a list of favorite playlists by clicking on option 112. At a later time, a user can return to a favorite playlist at which point the user joins or rejoins the viewer group associated with that playlist.

If desired, related content such as targeted advertisements may be displayed in region 38. Related content such as targeted advertisements may be stored on related content server 24 (FIG. 1). Related content can include video clips, audio clips, graphics, text, images, etc. Related content items can be listed in the playlist 86 or may be played for the user without modifying the entries in playlist 86. Multicast media management engine 20 may analyze the entries in playlist 86 (e.g., based on media file titles, media file genres, etc.) and may analyze user-uploaded associated content in determining which content is related to the currently playing media files. If desired, content server 24 may be used to display content that is not directly related to the media files that are being played for users. For example, content server 24 can display advertisements from a sponsor that are not related to the media files that are being played. In general, however, targeting provides value for the service and is often desirable.

Users can upload comments using comments option 114. Comments option 114 may contain a region 118 through which the user can scroll using scroll bar 116. When a user desires to contribute a comment for region 118, the user can click on add comment tab 122. The user may then type in appropriate text and can submit that text to media server 12. The user can return to viewing comments in region 118 by clicking on comments tab 120. Comments that are uploaded to media server 12 using comments option 114 are typically persistent in that they can be stored by server 12 for days, months, or years. The comments are contributed by users as they are being presented with media files using media player 36, so the comments are generally associated with the media files.

Users can contribute tags using tag option 128. Tags 130, which are sometimes referred to as keywords, can be used as interactive navigational aids. For example, a user who is interested in being presented with additional screens and media files that are related to a particular tag may click on that tag. If, as an example, a user is interested in "California," the user can click on a California tag that has been displayed in a tag display region. When the user clicks on a tag, the multicast media management engine 20, takes the user to a related screen associated with the multicast media service.

Any suitable technique may be used for presenting users with tags 130. For example, the tags 130 may be presented in an interactive region in which the tags appear as if they are floating in space and in which cursor movements cause the tags to rotate with respect to the user's perspective. If a user desires to add a tag to the tags that are already associated with a currently playing media file, the user can click on add tag tab 132. After clicking on tab 132, the user can type the text for the user's tag contribution into a tag entry box. The user can then click on a submit button to submit the tag to media server 12 for storage as part of user-uploaded associated content 16. To return to viewing the tag cloud, the user can click on tag cloud tab 134.

The users who are being presented with the media files from the same playlist and the same screen 34 form a viewer group. For example, the users of the multicast media management service that are being presented with the media files of playlist 86 of FIG. 2 in a multicast from multicast media management engine 20 form a viewer group. When a user in one viewer group clicks on a tag 130, the multicast media management engine 20 provides the user with an opportunity to navigate to another viewer group. Navigation opportunities may be provided, for example, by presenting the user with a list of playlists having tags that match the tag selected by the user. The user can then click on a desired playlist. When the user clicks on the desired playlist, the multicast media management engine 20 displays the screen 34 that is associated with the viewer group for that playlist. Because the user will be viewing a screen that is associated with a new viewer group, the users listed in region 58 will be updated to reflect the membership of the new viewer group.

If desired, screen 34 may contain additional options for locating playlists of interest such as options 136. If a user clicks on featured option 138, the multicast media management service presents the user with a playlist of media files that are being promoted by the multicast media management service. Media files may be manually selected for inclusion on the featured list by personnel associated with the multicast media management service. If the user clicks on top ranked option 140, the multicast media management service identifies which media files have received high rankings. When the user clicks on rising option 142 or falling option 144, the multicast media management engine 20 may process information in the media server databases to determine which media files are rising in popularity and which media files are falling in popularity. Popularity may be gauged by number of plays, ratings, or any other suitable measure. Option 146 may be used to identify which media files that have been viewed most often by users. Top rated option 148 can be used to identify media files based on user-uploaded ratings information. Most discussed option 150 allows users to locate media files based on how much they have been discussed (either in chat messages provided in chat region 60 or comments provided in comments region 118 or both). If the user clicks on random option 152, the multicast media management engine 20 may present the user with a screen 34 including a playlist 86 that contains randomly select media files to present to the user.

The options 136 correspond to various filter criteria. For example, the filter criteria "top rated" is associated with option 148. When the user clicks on the top rated option 148, the multicast media management engine 20 may apply the "top rated" filter criteria to the media files 14 on server 12. This allows the multicast media management engine 20 to identify media files that match the filter criteria. The media files that have been identified as satisfying a user-selected filter criteria may be presented to a user using a playlist 86 of the type shown in FIG. 2. If desired, the multicast media management engine 20 may identify media file playlists that match the user-selected filter criteria in addition to or instead of identifying media file matches directly. For example, clicking on featured option 138 may direct the multicast media management engine 20 to identify featured playlists, clicking on option 140 may direct the multicast media management engine 20 to present the user with a list of top ranked playlists, clicking on rising option 142 may direct engine 20 to present the user with playlists whose popularity is rising, etc. When a user is presented with playlist results such as these, the user may click on a desired playlist. When a user clicks on a desired playlist, multicast media management engine 20 presents the user with a screen 34 in which the playlist is displayed for the user and in which the screen's media player is playing a media file on the playlist.

The multicast media management engine 20 may automatically identify possible modifications that may be made to the currently playing playlist 86. The multicast media management engine 20 may, as an example, observe that the majority of users in the viewer group have given high ratings to a given song. Based on this positive feedback, the multicast media management engine 20 may identify similar songs in media files 14 (e.g., songs of the same genre, songs that historically have been highly rated by users who highly rated the given song, etc.). After identifying the songs for possible inclusion in media file playlist 86, the multicast media management engine 20 may alert the users in the viewer group and ask for permission to include the newly identified song.

Any suitable mechanism may be used to notify the users of the multicast media management service of a recommended playlist modification. For example, the multicast media management engine 20 may direct clients 30 to display an interactive recommendation option on clients 30 (e.g., as a pop-up window presented on top of other content on screen 34). Another suitable arrangement involves displaying a recommended playlist modification region 106 of the type shown in FIG. 2. The recommended playlist modification region 106 may include information on the proposed modification such as the title of a media file to be added or deleted from the playlist 86. The recommended playlist modification region 106 may also contain interactive options such a voting buttons 108 and 110. Buttons 108 and 110 allow users in a viewing group to collectively decide whether or not to allow the proposed modification to the playlist. If, as an example, a majority of the users in a given viewer group click on the vote yes button 108 when the multicast media management engine 20 makes a proposal on a playlist modification to the given viewer group, the multicast media management engine 20 may make the modification and update playlist 86 accordingly. Information on the playlist 86 may be stored in a database on media server 12 (e.g., as playlist information 18). If, as another example, most of the users that responded to the proposed playlist modification voted not to modify the playlist, the playlist 86 will remain unchanged and the proposed media file addition or deletion will not be made by the multicast media management engine 20.

Figure 3:
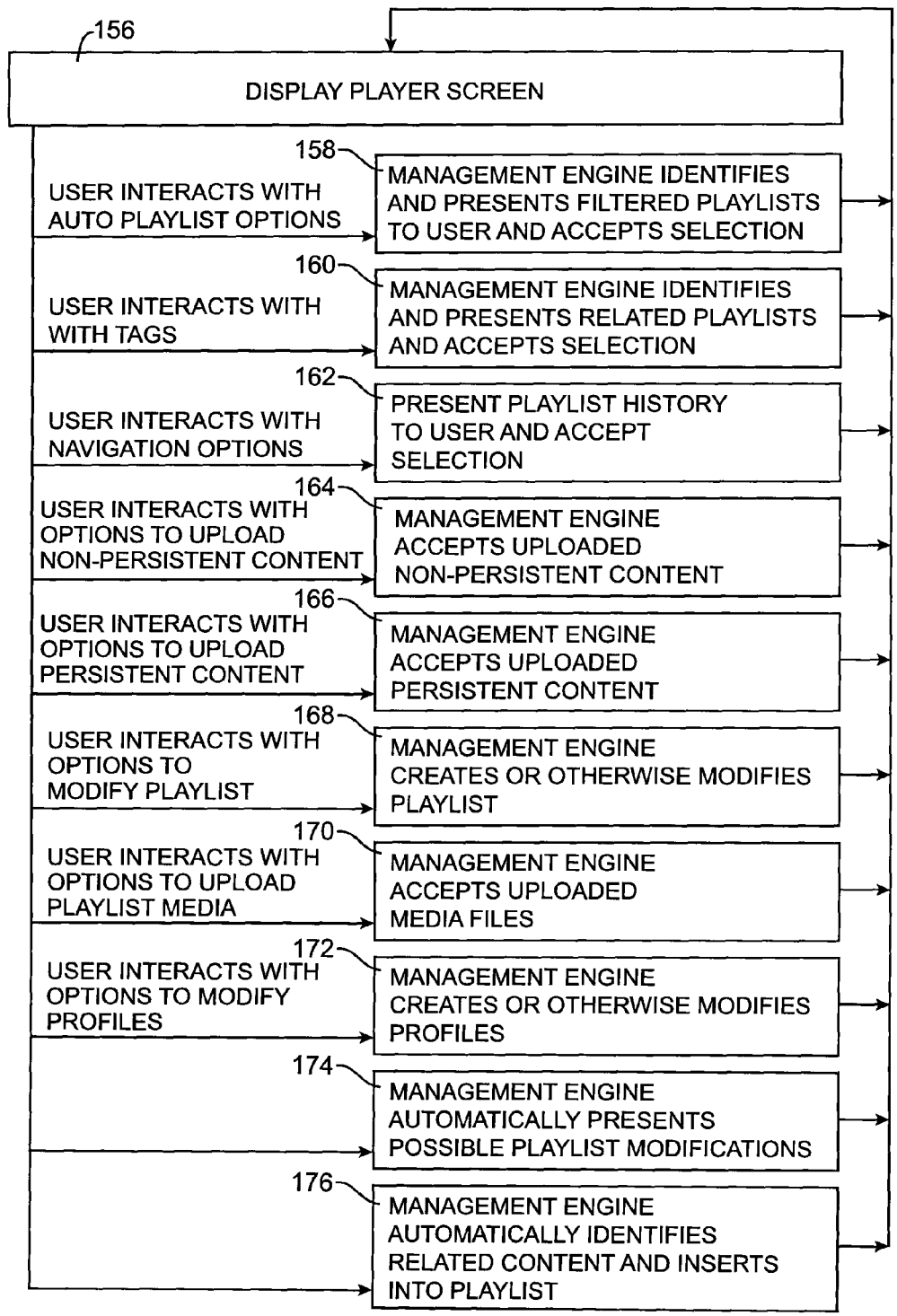
FIG. 3 is a flow chart of illustrative steps involved in using a multicast media service to present information to users in accordance with the present invention.

Illustrative steps involved in multicasting content to users in a viewer group while the users in that viewer group interact with each other using media player screens of the type shown in FIG. 2 are shown in FIG. 3.

At step 156, the multicast media service is used to display a media player screen such as screen 34 of FIG. 2 for users of the service. Screen 34 contains a media player 36 and a playlist 86. Media player 36 plays media files to users in a multicast fashion, so that multiple users view the same media files in synchronization. The users that receive the same multicast form a viewer group. When the service displays the media player screen to the users in the viewer group, region 58 is updated so that it contains a list of the current members of the viewer group. Users can interact with other members of the viewer group by uploading content that is associated with the currently playing media file and playlist. The multicast media management engine 20 facilitates communications between users by helping to ensure that the screen that is displayed for each user in the viewer group at step 156 contains the appropriate user-uploaded associated content and the appropriate information derived from that content. For example, the screen that is displayed at step 156 contains recent chat messages from viewer group members and contains ratings information that is derived from user-supplied ratings information.

During step 156, the multicast media service displays information that is generated using automated multicast media service processes. As an example, the multicast media management engine 20 can identify targeted advertisements to display for the users and can identify suggested playlist modifications to display for the users. In step 156, these automatically generated items can be displayed for the users in the viewer group.

If desired, clients 30 may use client-managed data 32 that is stored locally on user computing equipment 28 in determining what information is to be displayed during step 156. For example, clients 30 may locally maintain playlist history information on user computing equipment 28. As a user navigates through a playlist history using navigation buttons such as playlist history navigation buttons 124 and 126 of FIG. 2, the user's client 30 accesses client-managed data 32 on the user's equipment 28 to determine the playlist history appropriate for that user's session with the multicast media service.

Each time a user interacts with the service and each time the multicast media management engine 20 automatically take an action that influences the media player screen, the multicast media service displays an updated player screen to the appropriate users of the service. Because the player screen is continuously updated, users can interact with each other through the shared screen (including its accompanying audio track, if any). User actions and automatic multicast media service actions that influence the content of the media player screen that is presented to users are shown in the flow chart of FIG. 3.

A user may interact with the displayed media player screen 32 by selecting among predefined playlist options such as options 136 of FIG. 2. As described in connection with FIG. 2, a user may, as an example, click on featured option 138, top ranked option 140, etc. When the user clicks on one of the options 136, the user's request is transmitted from the user's client 30 to the multicast media management engine 20 at media server 12 over communications network 26. Multicast media management engine 20 receives the user's request and presents the user with appropriately filtered results at step 158. The multicast media management engine 20 also accepts resulting user selections from the user, so that the display player screen can be updated accordingly at step 156.

Options 136 may be used to present the user with a list of playlists that that match the selected filter criteria (e.g., a list of featured playlists from which a user can select a desired playlist to view). Options 136 may also be used to generate a single playlist (e.g., a single playlist of featured media files that is automatically presented to the user).

The user may also interact with the media player screen 32 by clicking on a tag 130 in tag cloud region 128 (FIG. 2). By selecting a tag or other such filter criteria, the user indicates to the multicast media service that the user is interested in a particular subject ("e.g., California"). At step 160, in response to the user's selection of a particular tag, the multicast media management engine 20 identifies one or more playlists that are related to the tag. For example, if the user clicks on a tag entitled "California," the multicast media management engine 20 may identify playlists that contain the word "California" in their title, playlists that contain the word "California" in one or more of the titles of the media files in the playlist, or that are otherwise related to the selected tag. If desired, multicast media management engine 20 can identify media file playlists that are related to a selected tag by determining which media metadata information (e.g., genre information, artist information, album title information, disc title information, year-of-release information, etc.) is related to the tag. These are merely illustrative examples. Multicast media management engine 20 may use any suitable technique to identify related playlists and media files for a user based on user selection of a tag or other such filter criteria.

When the user clicks on a tag 130, the multicast media management engine 20 may present the user with an interactive list of matches. For example, the multicast media management engine 20 may display a list of playlists that are related to the selected tag. The user can click on a desired one of the playlists. When the user clicks on the desired playlist, the multicast media management engine 20 presents the user with a media file playback screen that is associated with the selected playlist. If desired, the multicast media management engine 20 may automatically present the user with a matching playlist (i.e., without requiring the user to make an intermediate playlist selection).

When the user clicks on a tag, the user is presented with a screen in which a new playlist is being played. The user therefore becomes part of a new viewer group and is no longer associated with the user's initial viewer group. Clicking on tags serves as a form of navigation between viewer groups as well as a form of navigation between playlists and media file player screens.

A user may also navigate using navigation buttons such as playlist history buttons 124 and 126 of FIG. 2. When a user clicks on an on-screen navigation option such as button 124 or button 126, the multicast media management service presents the user with playlist history information such as information on previous playlists, information on previously played media files in the current or previous playlists, etc. (step 162). The multicast media management service may automatically present the user with a media player screen containing a playlist from the user's playlist history or may present the user with navigational choices from which the user selects before being presented with an appropriate media player screen. If the user's playlist history actions take the user to a new viewer group, the list of users in region 58 is updated.

As users in a particular viewer group are receiving and playing multicast media files from a common playlist, some or all of the users in the viewer group may communicate by uploading non-persistent content such as chat messages. Users may upload chat messages using a chat region such as chat region 74 of FIG. 2. At step 164 of FIG. 3, the multicast media management engine 20 accepts uploaded non-persistent content such as chat messages. At step 156, the multicast media management engine 20 multicasts the uploaded chat messages back to the users in the viewer group. Each user in the viewer group can use region 60 to view chat messages from other users.

In addition to uploading non-persistent content, users can upload persistent content. Examples of persistent content that may be uploaded to media server 12 include ratings (e.g., star ratings, thumbs up/down ratings, etc.), comments added using a comment region such as comment region 118 of FIG. 2, and tags. The content that is uploaded generally pertains to the currently playing media file and playlist. At step 166, multicast media management engine 20 accepts user-uploaded persistent associated content such as tags, comments, and ratings. User-uploaded content 16 may be stored in a suitable database on media server 12 (FIG. 2). An updated media playback screen is displayed for all users in the appropriate viewer group at step 156.

If desired, users can modify playlists. Playlist modification operations may include the creation of new playlists and the editing of existing playlists. With one suitable arrangement, multicast media management engine 20 presents users with opportunities to create profile screens. Profile screens may include personal information, an embedded media player that can automatically play a media file to a browsing user, links to items of interest in the multicast media system, blog entries, links to personal profiles associated with friends, links to profiles associated with musical and video artists of interest, etc. Playlists may be created by clicking on a suitable "create new playlist" option on a profile screen. Playlists may be edited by clicking on an "edit playlist" option on a screen associated with the service. If desired, playlists may also be created and edited by selecting appropriate create and edit options from a drop-down menu, a list of options, etc.

During playlist modification operations (e.g., during playlist creation and editing), a user can add media files to a playlist, can delete media files from the playlist, and can change the order of media files in the playlist. As shown in FIG. 3, the multicast media management engine 20 accepts user input related to media file playlist modifications and creates or otherwise modifies user-supplied playlists at step 168. The multicast media management engine 20 stores playlists and profile information 18 in one or more suitable databases on media server 12, as shown in FIG. 2.

Media file content may be provided to the multicast media service using any suitable technique. For example, media file owners can deliver media files to the multicast media service electronically over communications network 26, on discs, etc. With one suitable arrangement, at least some of the media files are provided to the multicast media service from users. A user may upload a media file to the multicast media service over communications network 26 using the user's client 30. At the media server 12, multicast media management engine 20 may accept the user uploaded media files and may store these files with other media files 14 in a suitable database.

If desired, multicast media management engine 20 may require users to log into the multicast media service before the user is allowed to perform certain functions. A user who desires to log into the service may visit a home page associated with the service (as an example). During login procedures on the home page, the multicast media management service gathers credentials such as username and password credentials from a user who desires to log into the service. The user is then authenticated to the media server 12 by checking the users credentials against user credentials that are stored in a database 22 on media server 12. Following successful authentication, the user may be allowed to upload media files and other content (step 170 of FIG. 3). In a typical arrangement, a user is presented with screens that allow the user to login to the service, to select media files for uploading (e.g., by browsing to a desired file location), to enter one or more tags or other information related to the selected media files, and to initiate the upload process (e.g., by clicking on a submit button).

Users may interact with on-screen options to create or edit profiles. A user may, for example, click on a create profile button or an edit profile button. When the multicast media management service receives a request to modify a profile, the user is presented with screens that allow the user to add or modify links, blog posts, cover art, media files, playlists, personal information, and other information that is associated with a profile. At step 172, multicast media management engine 20 receives user-uploaded profile information.

While the multicast media management system is in operation and is delivering multicasts of media files to the users in a viewer group, the multicast media management engine 20 automatically analyzes the data stored in the databases of media server 12. Based on this analysis, the multicast media management engine 20 presents users with a media player screen 34 that contains possible playlist modifications (step 174). As described in connection with FIG. 2, playlist modification suggestions may be presented using a pop-up window or a region such as recommended playlist modification region 106. Users in the same viewer group can vote or otherwise provide feedback relating to whether or not the proposed playlist modification should be made. If the playlist modification is acceptable to the users in the viewer group, the multicast media management engine 20 modifies the playlist and presents an updated media file player screen (step 156).

The multicast media management engine 20 may analyze any suitable data at media server 12. For example, the multicast media management engine 20 may analyze user-uploaded associated content 16 such as tags, comments, and ratings. The multicast media management engine 20 can also analyze playlists and profile information 18 and media files 14. If desired, the current playlist can be analyzed.

If a particular media file is rated poorly (e.g., with a low star rating or a thumbs-down rating), is given negative-sounding tags (e.g., "bad"), or receives unflattering comments, the multicast media management engine 20 can propose that the media file be removed from the playlist before it has finished playing or may temporarily skip the media file before it has finished playing. The multicast media management engine 20 may also propose that similar songs (as determined by metadata information, title matches, etc.) be removed from the playlist. If a media file receives a high rating (e.g., a high star rating or a thumbs up rating), positive-sounding tags (e.g., "good"), or flattering comments, the multicast media management engine 20 can propose that the media file be added to the current playlist. Other information that may influence the proposals made by the multicast media management engine 20 include the number of different users who upload data in association with a given media file, the number of uploads that are associated with a given media file, the number of votes given to recent playlist modification suggestions, etc.

If desired, the multicast media management engine 20 may make playlist modifications automatically based on viewer group feedback without presenting intermediate proposal screens. For example, media files can be inserted and deleted from a playlist based on viewer group ratings.

The creator of a playlist may, if desired, be provided with exclusive or elevated rights to modify a playlist. For example, the modification operations described in connection with steps 168 and 172 may be made available only to playlist creators or may be made available to multiple users under the control of a playlist creator.

The multicast media management engine 20 can automatically insert content into a playlist (step 176). For example, multicast media management engine 20 can insert an advertisement into the playlist between two popular songs. The presence of the advertisement in the playlist can be hidden by suppressing the entry for the advertisement in the playlist. If desired, the presence of the advertisement can be indicated by inserting appropriate text into the playlist (e.g., "advertisement" or the title of the advertisement). Regardless of whether the advertisement or other content is listed in the playlist on the media player screen 34, the advertisement or other content may be said to be contained within the playlist.

The content that the multicast media service inserts into the playlist may be provided to clients 30 from related content server 24. The content may be related (e.g., targeted advertisements) or may be unrelated to the media files being broadcast by the service.

Multicast media management engine 20 can analyze the data on media server 12 to determine whether or not to insert particular content and, if content is to be inserted, to determine which content is relevant to the media file and/or media file playlist and should be inserted. Relevancy may be determined by using multicast media management engine 20 to analyze user-uploaded associated content 16 such as tags, comments, and ratings, content such as playlists (user-generated and automatically generated), profile information, and media files (e.g., by comparing titles or other metadata).

The foregoing is merely illustrative of the principles of this invention and various modifications can be made by those skilled in the art without departing from the scope and spirit of the invention.

What is claimed is:

1. A method for supporting an online multicast media service that is implemented using a media server that multicasts media files to users at user computing equipment over a communications network, comprising:

maintaining at least one playlist of media files at the media server;

multicasting each media file in the playlist to multiple users in a viewer group simultaneously over the communications network, wherein each user has a respective media player that is implemented on the user computing equipment of that user and wherein each respective media player plays the media file that is being multicasted in synchronization;

displaying the playlist on the user computing equipment of each of the users in the viewer group while the media file is being multicasted to the users in the viewer group; and at the media server, receiving user-uploaded content from the user computing equipment of at least some of the users in the viewer group, wherein the user-uploaded content is associated with the playlist and with the media file that is being multicasted and is received at the media server in real time as the media file is being multicasted.

2. The method defined in claim 1 wherein receiving the user-uploaded content from the user computing equipment comprises receiving tags that are associated with the media file that is being multicasted.

3. The method defined in claim 1 wherein receiving the user-uploaded content from the user computing equipment comprises receiving persistent comments that are associated with the media file that is being multicasted.

4. The method defined in claim 1 wherein receiving the user-uploaded content from the user computing equipment comprises receiving chat messages that are associated with the media file that is being multicasted.

5. The method defined in claim 1 wherein receiving the user-uploaded content from the user computing equipment comprises receiving user-supplied ratings that are associated with the media file that is being multicasted.

6. The method defined in claim 1 further comprising:
using a multicast media management engine running on the media server to automatically determine which related content to display on the user computing equipment, wherein the related content is related to at least one of the media files in the playlist.

7. The method defined in claim 1 further comprising:
displaying a targeted advertisement on the user computing equipment, wherein the targeted advertisement is related to at least one of the media files in the playlist.

8. The method defined in claim 1 further comprising:
using a multicast media management engine running on the media server to automatically display proposed playlist modifications for the users of the viewer group on the user computing equipment of the users.

9. The method defined in claim 1 further comprising:
using a multicast media management engine running on the media server to automatically display proposed playlist modifications for the users of the viewer group on the user computing equipment of the users;
displaying voting options for the users of the viewer group on the user computing equipment; and
in response to votes from the users, using the multicast media management engine running on the media server to automatically decide whether to make the proposed playlist modification.

10. The method defined in claim 1 further comprising:
with a multicast media management engine running on the media server, analyzing the user-uploaded content; and
based on the analysis of the user-uploaded content, automatically displaying a proposed playlist modification for the users of the viewer group on the user computing equipment of the users.

11. The method defined in claim 1 further comprising:
with a multicast media management engine running on the media server, analyzing the user-uploaded content;
based on the analysis of the user-uploaded content, automatically displaying a proposed playlist modification for the users of the viewer group on the user computing equipment of the users; and
with the multicast media management engine, receiving feedback from the users of the viewer group indicating whether or not the multicast media management engine should make the proposed playlist modification.

12. The method defined in claim 1 further comprising:
with a multicast media management engine running on the media server, analyzing the user-uploaded content, wherein the user uploaded content includes at least one user-supplied rating;
based on the analysis of the user-uploaded content including the user-supplied rating, automatically displaying a proposed playlist modification for the users of the viewer group on the user computing equipment of the users; and
with the multicast media management engine, receiving feedback from the users of the viewer group indicating whether or not the multicast media management engine should make the proposed playlist modification.

13. The method defined in claim 1 further comprising:
with a multicast media management engine running on the media server, analyzing the user-uploaded content, wherein the user uploaded content includes at least one persistent comment that describes at least one media file in the playlist;
based on the analysis of the user-uploaded content including the user-supplied persistent comment, automatically displaying a proposed playlist modification for the users of the viewer group on the user computing equipment of the users; and
with the multicast media management engine, receiving feedback from the users of the viewer group indicating whether or not the multicast media management engine should make the proposed playlist modification.

14. The method defined in claim 1 further comprising:
with a multicast media management engine running on the media server, analyzing the user-uploaded content, wherein the user uploaded content includes at least one tag that describes at least one media file in the playlist;
based on the analysis of the user-uploaded content including the user-supplied tag, automatically displaying a proposed playlist modification for the users of the viewer group on the user computing equipment of the users; and
with the multicast media management engine, receiving feedback from the users of the viewer group indicating whether or not the multicast media management engine should make the proposed playlist modification.

15. The method defined in claim 1 further comprising:
with a multicast media management engine running on the media server, analyzing the user-uploaded content, wherein the user uploaded content includes at least one tag that describes at least one media file in the playlist and at least one media file rating corresponding to one of the media files on the playlist;
based on the analysis of the user-uploaded content including the user-supplied tag and the rating, automatically displaying a proposed playlist modification for the users of the viewer group on the user computing equipment of the users; and
with the multicast media management engine, receiving feedback from the users of the viewer group indicating whether or not the multicast media management engine should make the proposed playlist modification.

16. The method defined in claim 1 further comprising:
with a multicast media management engine running on the media server, analyzing the user-uploaded content, wherein the user uploaded content includes at least one tag that describes at least one media file in the playlist and at least one media file rating corresponding to one of the media files on the playlist;
based on the analysis of the user-uploaded content including the user-supplied tag and the rating, automatically displaying a proposed playlist modification for the users of the viewer group on the user computing equipment of the users;
with the multicast media management engine, receiving feedback from the users of the viewer group indicating whether or not the multicast media management engine should make the proposed playlist modification; and
when the feedback indicates that the playlist modification should be made, with the multicast media management engine displaying a modified playlist for the users of the viewer group on the user computing equipment of the users, wherein the modified playlist contains a different set of media files than the playlist.

17. The method defined in claim 1 further comprising:
at the user computing equipment of a given one of the users, allowing the given user to click on an automatic playlist option;

in response to clicking on the automatic playlist option, automatically identifying a playlist using a multicast media management engine running on the media server; and displaying the automatically identified playlist for the given user on the user computing equipment of the given user.

18. The method defined in claim 1 further comprising:

at the user computing equipment of a given one of the users, allowing the given user to click on an on-screen playlist history option;

in response to the user clicking on the playlist history option, displaying playlist history information on the user computing equipment of the given user.

19. The method defined in claim 1 further comprising:

gathering ratings on the media files from the users over the communications network; and displaying the ratings in the playlist for the users.

20. The method defined in claim 1 further comprising:

for each of the users in the viewer group, displaying on the user computing equipment of that user a list of the users in the viewer group on a screen that also contains the playlist.

\* \* \* \* \*